(12) United States Patent
Frantz

(10) Patent No.: US 12,264,474 B2
(45) Date of Patent: Apr. 1, 2025

(54) BUILDING PANEL SYSTEM

(71) Applicant: ARMSTRONG WORLD INDUSTRIES, INC., Lancaster, PA (US)

(72) Inventor: William H. Frantz, Elizabethtown, PA (US)

(73) Assignee: AWI Licensing LLC, Wilmington, DE (US)

( * ) Notice: Subject to any disclaimer, the term of this patent is extended or adjusted under 35 U.S.C. 154(b) by 138 days.

(21) Appl. No.: 16/082,652

(22) PCT Filed: Mar. 22, 2017

(86) PCT No.: PCT/US2017/023587
§ 371 (c)(1),
(2) Date: Sep. 6, 2018

(87) PCT Pub. No.: WO2017/165516
PCT Pub. Date: Sep. 28, 2017

(65) Prior Publication Data
US 2019/0112809 A1    Apr. 18, 2019

Related U.S. Application Data

(60) Provisional application No. 62/312,299, filed on Mar. 23, 2016.

(51) Int. Cl.
*E04B 9/04* (2006.01)
*E04B 1/80* (2006.01)
(Continued)

(52) U.S. Cl.
CPC .............. *E04B 9/0421* (2013.01); *E04B 9/04* (2013.01); *E04B 9/127* (2013.01); *E04B 9/363* (2013.01);
(Continued)

(58) Field of Classification Search
CPC . E04B 1/80; E04B 9/04; E04B 9/0421; E04B 9/0435; E04B 9/127; E04B 9/363;
(Continued)

(56) References Cited

U.S. PATENT DOCUMENTS 4,189,394 A * 2/1980 Schroder ................ C09K 5/063
                                                    252/70
5,626,936 A    5/1997 Alderman
(Continued)

FOREIGN PATENT DOCUMENTS

DE    102016005172 A1 * 11/2017
GB         2453142         4/2009
(Continued)

OTHER PUBLICATIONS

Machine Translation JP2013204285A (Year: 2013).*
(Continued)

*Primary Examiner* — Len Tran
*Assistant Examiner* — Gustavo A Hincapie Serna
(74) *Attorney, Agent, or Firm* — Patrick Sheldrake

(57) ABSTRACT

A building panel system is provided. The building panel system include a panel structure having a first surface and a second surface opposite the first surface; a mounting system attached to the panel structure; at least one container detachably coupled to the mounting system at one of a plurality of selectable coupling positions so as to be in conductive thermal cooperation with the first surface of the panel structure; and a phase change material contained within the at least one container.

18 Claims, 18 Drawing Sheets

(51) Int. Cl.
  *E04B 9/12* (2006.01)
  *E04B 9/36* (2006.01)
  *E04C 2/52* (2006.01)
  *F24F 5/00* (2006.01)
  *F28D 20/00* (2006.01)
  *F28D 20/02* (2006.01)

(52) U.S. Cl.
  CPC ............ *E04C 2/525* (2013.01); *F24F 5/0021* (2013.01); *E04B 1/80* (2013.01); *E04B 9/0435* (2013.01); *E04C 2/523* (2013.01); *F28D 2020/0008* (2013.01); *F28D 20/021* (2013.01); *Y02E 60/14* (2013.01)

(58) Field of Classification Search
  CPC ........ E04C 2/523; E04C 2/525; F24F 5/0021; F28D 20/021; F28D 2020/0008
  USPC .......................................................... 165/56
  See application file for complete search history.

(56) References Cited

U.S. PATENT DOCUMENTS

| | | | |
|---|---|---|---|
| 6,230,444 B1 | 5/2001 | Pause | |
| 6,308,518 B1* | 10/2001 | Hunter .................... | F25B 21/02 62/3.6 |
| 7,703,254 B2 | 4/2010 | Alderman | |
| 7,704,584 B2* | 4/2010 | Alderman ................ | C08K 3/32 165/104.19 |
| 9,359,766 B2* | 6/2016 | Shiao ........................ | E04D 5/10 |
| 2003/0167718 A1* | 9/2003 | Alderman ........... | E04D 13/1618 52/404.3 |
| 2005/0040152 A1* | 2/2005 | Koschenz ............... | F24D 3/165 219/213 |
| 2008/0282637 A1* | 11/2008 | Alderman ............. | E04B 9/0478 52/506.01 |
| 2009/0011171 A1* | 1/2009 | Alderman ................ | E04B 1/78 428/72 |
| 2009/0223160 A1 | 9/2009 | Hittle et al. | |
| 2010/0198414 A1* | 8/2010 | Kroll ........................ | F24D 3/14 165/56 |
| 2011/0179807 A1* | 7/2011 | Holloway ............. | F24F 5/0017 62/530 |
| 2013/0157084 A1* | 6/2013 | Bang ..................... | H01M 50/55 429/7 |
| 2013/0192793 A1* | 8/2013 | Guckert ................ | F28D 20/023 165/49 |
| 2015/0056404 A1 | 2/2015 | Sawafta et al. | |
| 2015/0121944 A1 | 5/2015 | Bako-Biro et al. | |
| 2017/0130969 A1* | 5/2017 | Lester ..................... | F24S 40/20 |
| 2017/0146251 A1* | 5/2017 | Radzinsky ........... | F24F 5/0092 |
| 2018/0003396 A1* | 1/2018 | Wójcik ................ | F28D 15/0275 |
| 2018/0066429 A1* | 3/2018 | Yau ......................... | E04C 2/523 |
| 2018/0106564 A1* | 4/2018 | Isaacs ..................... | B22F 10/28 |
| 2018/0148928 A1* | 5/2018 | Bergman ................ | F16B 5/125 |
| 2018/0202669 A1* | 7/2018 | Baratti ..................... | F24D 3/142 |
| 2018/0313080 A1* | 11/2018 | Schmetzer .............. | B32B 37/24 |
| 2018/0313613 A1* | 11/2018 | Chopard ................. | F24H 1/182 |
| 2018/0356103 A1* | 12/2018 | Perkins .................. | B32B 13/02 |

FOREIGN PATENT DOCUMENTS

| | | | |
|---|---|---|---|
| JP | H04214138 A | | 8/1992 |
| JP | 2000283481 A | * | 10/2000 |
| JP | 2008032260 A | | 2/2008 |
| JP | 2013204285 | | 10/2013 |
| JP | 2013204285 A | * | 10/2013 |
| JP | 2015087048 A | * | 5/2015 |
| JP | 2015140987 A | * | 8/2015 |
| JP | 2017172883 A | * | 9/2017 |
| WO | 9402257 | | 2/1994 |
| WO | 2007039221 | | 4/2007 |
| WO | 201361035 | | 5/2013 |
| WO | 2013191554 | | 12/2013 |
| WO | WO-2017091855 A1 | * | 6/2017 ............ B32B 13/02 |

OTHER PUBLICATIONS

International Search Report for Corresponding Application No. PCT/US2017/023587, mailed Jun. 15, 2017. WO.

European Extended Search Report for Related Application No. 17771056.3, dated Nov. 11, 2019.

* cited by examiner

BUILDING PANEL SYSTEM

CROSS-REFERENCE TO RELATED APPLICATION

This application is a National Stage of International Application No. PCT/US2017/023587 filed on Mar. 22, 2017, which claims the benefit of U.S. Provisional Application No. 62/312,299, filed Mar. 23, 2016, which are incorporated herein by reference in their entireties.

FIELD

The present invention relates to building panel systems. Particular embodiments of the invention relate to a container filled with phase change material secured to a ceiling panel used in a suspended ceiling system as well as a canopy or cloud ceiling system, as well as individual hanging baffle system.

BACKGROUND

Many types of ceiling systems and methods for mounting ceiling panels have been used. One type of system uses a suspended metal support grid including an array of orthogonally intersecting grid support members. An array of grid openings are formed between the grid support members. These openings are filled by the ceiling panels. Ceiling panels are mounted to and supported by the support grid using numerous approaches. Other types of ceiling systems can use ceiling panels, such as plank ceiling systems, canopy type ceiling systems and baffle type ceiling systems. In an effort to conserve energy, phase change material can be placed above or in the ceiling panel to absorb or expel heat into the room below the ceiling. The phase change material can change from a liquid to a gas or from a solid to a liquid when heat is absorbed from the room. Conversely, the phase change material can change from a gas to a liquid or from a liquid to a solid when heat is expelled into the room. By storing thermal energy in the phase change material and expelling it back into the room at the appropriate time, energy costs can be reduced. Ceiling systems using phase change material can be heavy, requiring many extra hangers to support the panels. Ceiling systems using phase change material can also exhibit little acoustic absorption, be inflexible in size and format, be fixed in storage capacity, and be incapable of being cut or modified on the job site. Many of these same problems exist in wall systems.

Accordingly, an improved system and method for using phase change material in a ceiling panel and ceiling system is desired. In addition, an improved system and method for using phase change material in a wall panel and wall system is desired.

SUMMARY

A building panel according to the present disclosure is part of a building system such as a ceiling or wall. In particular embodiments, the building panel is supported by a grid system which separates an occupied space from a plenum space. The occupied space is space below the ceiling system such as office space or the like. The plenum space is space above the ceiling system in which mechanical, electrical and other building systems and equipment is housed.

A building panel according to the present disclosure provides one or more containers filled with a phase change material. The containers can be attached to the building panel structure at different selectable locations.

Advantageously, this structure, particularly in conjunction with a lightweight phase change material, provides a system that allows the number and position of standard containers filled with phase change material to be adapted to the conditions on the job site during installation. In this description, examples of ceiling panels will be discussed to describe aspects of the invention. It is noted that in this description, features of the described ceiling panel also apply to wall panels and other building panels.

In one aspect, a building panel apparatus includes: a panel structure having a first surface and a second surface opposite the first surface; a mounting system attached to the panel structure; at least one container detachably coupled to the mounting system at one of a plurality of selectable coupling positions so as to be in conductive thermal cooperation with the first surface of the panel structure; and a phase change material contained within the at least one container.

In some embodiments, the mounting system comprises at least one rail mounted to the first surface of the panel structure.

In some embodiments, the mounting system comprises two rails mounted to the first surface of the panel structure.

In some embodiments, the at least one container has a first end and a second end opposite the first end, the first end has an engaging element, and the mounting system has a first engagement area that engages the engaging element such that the mounting system detachably couples the at least one container to the panel structure in one of the plurality of selectable coupling positions.

In some embodiments, the second end has an engaging element, and the mounting system has a second engagement area that engages the engaging element of the second end such that the mounting system detachably couples the at least one container to the panel structure in one of the plurality of selectable coupling positions.

In some embodiments, the mounting system is fixed to the first side of the panel structure.

In some embodiments, the at least one container is detachably snapped into the mounting system in one of the plurality of selectable coupling positions.

In some embodiments, the mounting system is detachably connected to the first side of the panel structure.

In some embodiments, the at least one container is polyethylene or polypropylene.

Some embodiments include a plurality of the at least one container.

Some embodiments include three of the at least one container, wherein the three containers are arranged in a row and a middle one of the containers contacts both of the other two of the three containers.

In some embodiments, the panel structure has an impeding feature, and at least one of the plurality of selectable coupling positions is located to allow coupling of the at least one container to the first side of the panel structure such that the at least one container avoids the impeding feature.

In some embodiments, the impeding feature is an opening in the panel structure for the insertion of a device.

Some embodiments include a thermally conductive adhesive coupling the at least one container to the first surface of the panel structure.

In some embodiments, the phase change material comprises a salt hydrate material.

In some embodiments, the phase change material comprises water, calcium chloride and a nucleating agent.

In some embodiments, the at least one container further comprises one or more heat transfer inducing surface features.

In some embodiments, the one or more heat transfer inducing surface features are fins In another aspect, a building panel apparatus includes: a panel structure having a first surface and a second surface opposite the first surface; at least one container; a phase change material contained within the at least one container; and a thermally conductive adhesive coupling the at least one container to the first surface of the panel structure.

In some embodiments, the at least one container is coupled to the first surface of the panel structure solely by the thermally conductive adhesive.

In some embodiments, the at least one container has a first surface that is substantially parallel to the first surface of the panel structure, and the thermally conductive adhesive covers substantially all of the first surface of the at least one container.

In some embodiments, the thermally conductive adhesive has a coefficient of thermal conductivity greater than air at 70 degrees Fahrenheit.

In some embodiments, the thermally conductive adhesive has a coefficient of thermal conductivity ranging from about 0.5 W/mC to about 3.0 W/mC In some embodiments, the thermally conductive adhesive is one of the group consisting of thermally conductive grease, aluminum filled paste, and thermally conductive epoxy.

In some embodiments, the thermally conductive adhesive conforms to a shape of a surface of the container that is adjacent the first surface of the panel structure.

In some embodiments, the panel structure has a plurality of selectable coupling positions, and the at least one container is coupled to the first surface of the panel structure at one of the plurality of selectable coupling positions by the thermally conductive adhesive.

In some embodiments, the at least one container has a length, a width, and a thickness, the length, the width, and the thickness are all perpendicular to each other, the thickness is perpendicular to the first surface of the panel structure, and the thickness is smaller than the length and width.

In some embodiments, wherein the thickness of the at least one container is uniform over the entire at least one container.

In some embodiments, the thickness of the at least one container is less than about ten percent of the width of the at least one container, and the thickness of the at least one container is less than about ten percent of the length of the at least one container.

Some embodiments include a mounting system attached to the panel structure, wherein the at least one container is positioned by the mounting system.

In some embodiments, the mounting system comprises at least one rail mounted to the first surface of the panel structure.

In some embodiments, the mounting system comprises two rails mounted to the first surface of the panel structure.

In another aspect, a building panel apparatus includes: a panel structure having a first surface and a second surface opposite the first surface; at least one container in conductive thermal cooperation with the first surface of the panel structure; a phase change material contained within the at least one container; and a plurality of thermally conductive elements positioned within the phase change material.

In some embodiments, the thermally conductive elements are thermally conductive fibers.

In some embodiments, a portion of the thermally conductive elements have different lengths.

In some embodiments, the coefficient of thermal conductivity of the thermally conductive elements is greater than the coefficient of thermal conductivity of the phase change material.

In some embodiments, the thermally conductive elements are one of the group consisting of: silica or aluminum fibers or shards, as well as glass fibers.

In some embodiments, the panel structure has a plurality of selectable coupling positions, and the at least one container is coupled to the first surface of the panel structure at one of the plurality of selectable coupling positions.

Some embodiments include a mounting system attached to the panel structure, wherein the at least one container is coupled to the mounting system at one of a plurality of selectable coupling positions.

In some embodiments, the at least one container is detachably coupled to the mounting system at one of a plurality of selectable coupling positions.

In another aspect, a building panel apparatus includes: a panel structure having a first surface and a second surface opposite the first surface; at least one container detachably coupled to the panel structure so as to be in conductive thermal cooperation with the first surface of the panel structure; a phase change material contained within the at least one container; and a fluid conduit positioned within the phase change material, the fluid conduit extending from a fluid inlet to a fluid outlet, the fluid inlet being configured to introduce a fluid into the fluid conduit from a first position outside of the at least one container, and the fluid outlet being configured to dispense the fluid from the fluid conduit to a second position outside of the at least one container.

In some embodiments, the fluid conduit is a heat exchanger that transfers thermal energy between the phase change material and the fluid in the fluid conduit.

In some embodiments, the fluid conduit follows a path that is shaped like multiple "S" shapes.

In some embodiments, at least one protrusion on the fluid conduit, the at least one protrusion extending from the fluid conduit into the phase change material.

In some embodiments, the at least one protrusion is a fin.

Some embodiments include two of the at least one container, and further include a conduit coupling that couples the fluid outlet of a first one of the containers to the fluid inlet of a second one of the containers such that the fluid that passes through the first one of the containers also passes through the second one of the containers.

In some embodiments, the conduit coupling is detachable.

In another aspect, a building panel apparatus includes: a panel structure having a first surface and a second surface opposite to the first surface; at least one container detachably coupled to the panel structure so as to be in conductive thermal cooperation with the first surface of the panel structure; a phase change material contained within the at least one container; and a fluid conduit positioned adjacent to the at least one container, the fluid conduit extending from a fluid inlet to a fluid outlet, the fluid inlet being configured to introduce a fluid into the fluid conduit from a first position outside of the at least one container, and the fluid outlet being configured to dispense the fluid from the fluid conduit to a second position outside of the at least one container.

In some embodiments, the fluid conduit follows a path that is "U" shaped.

In some embodiments, the fluid conduit is in physical contact with the container.

In some embodiments, the container further comprises a channel in which the fluid conduit is received.

Some embodiments include two of the at least one container, and a conduit coupling that couples the fluid outlet of a first section of the fluid conduit to the fluid inlet of a second section of the fluid conduit.

In some embodiments, the conduit coupling is detachable.

Some embodiments include a mounting rail having a containment bracket and a holding member, the containment bracket and the holding member releasably holding the container in position on the panel structure.

In another aspect, a ceiling system includes: a support grid; and a plurality of the building panel apparatuses according to one or more of the above aspects.

In another aspect, a ceiling system includes: a ceiling support structure; and at least one of the building panel apparatuses according to one or more of the above aspects.

In another aspect, a wall system includes: a wall support structure; and a plurality of building panel apparatuses according to one or more of the above aspects.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a perspective view of a container having a fluid conduit running there through;

FIG. 16 is a top view of two containers having a fluid conduit running there through;

Figure 1:
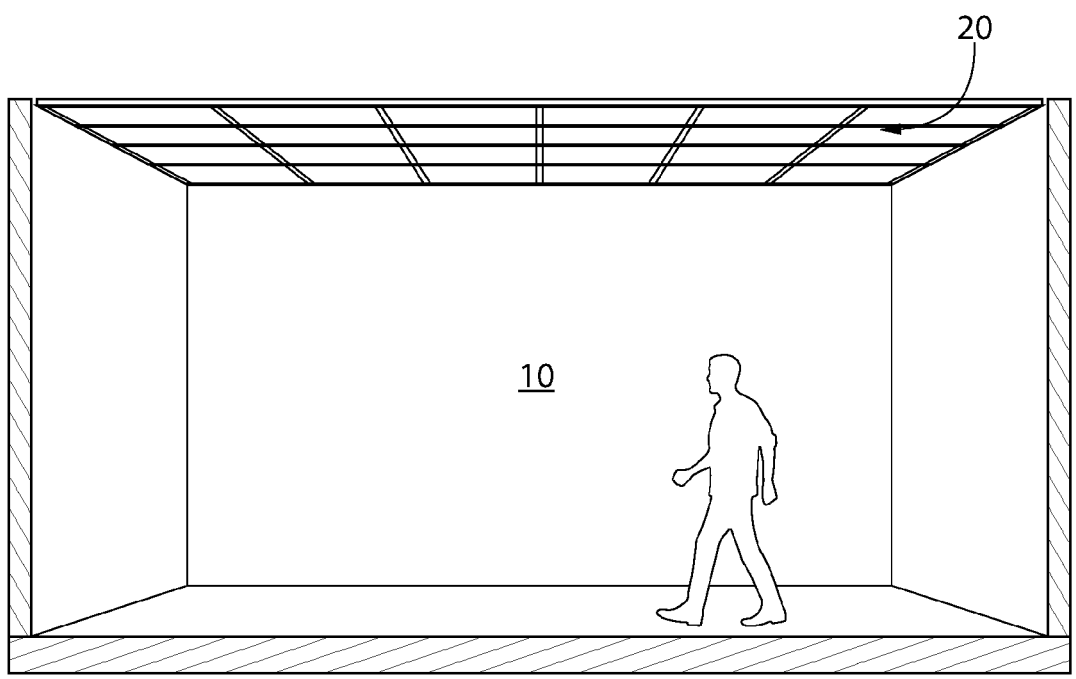
FIG. 1 is a side view of an occupied space.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 2:
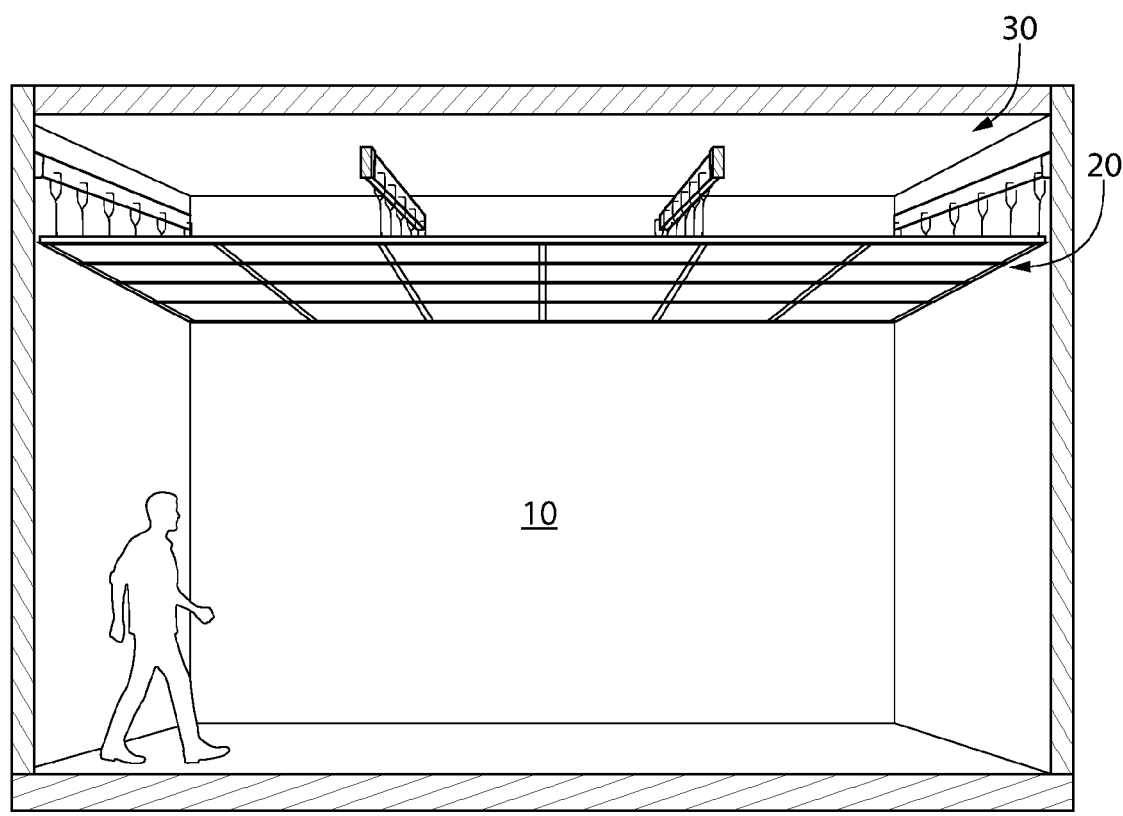
FIG. 2 is a sectional view of an occupied space, ceiling system, and plenum space.

An example of a ceiling system in accordance with embodiments of the invention will now be described. FIGS. 1 and 2 show an example of a ceiling system in accordance with embodiments of the invention. An occupied space 10 such as, for example, office space is shown below a ceiling system 20. Above ceiling system 20 is a plenum space 30 that houses building systems such as ductwork, wiring, water piping and fire sprinkler piping.

Figure 3:
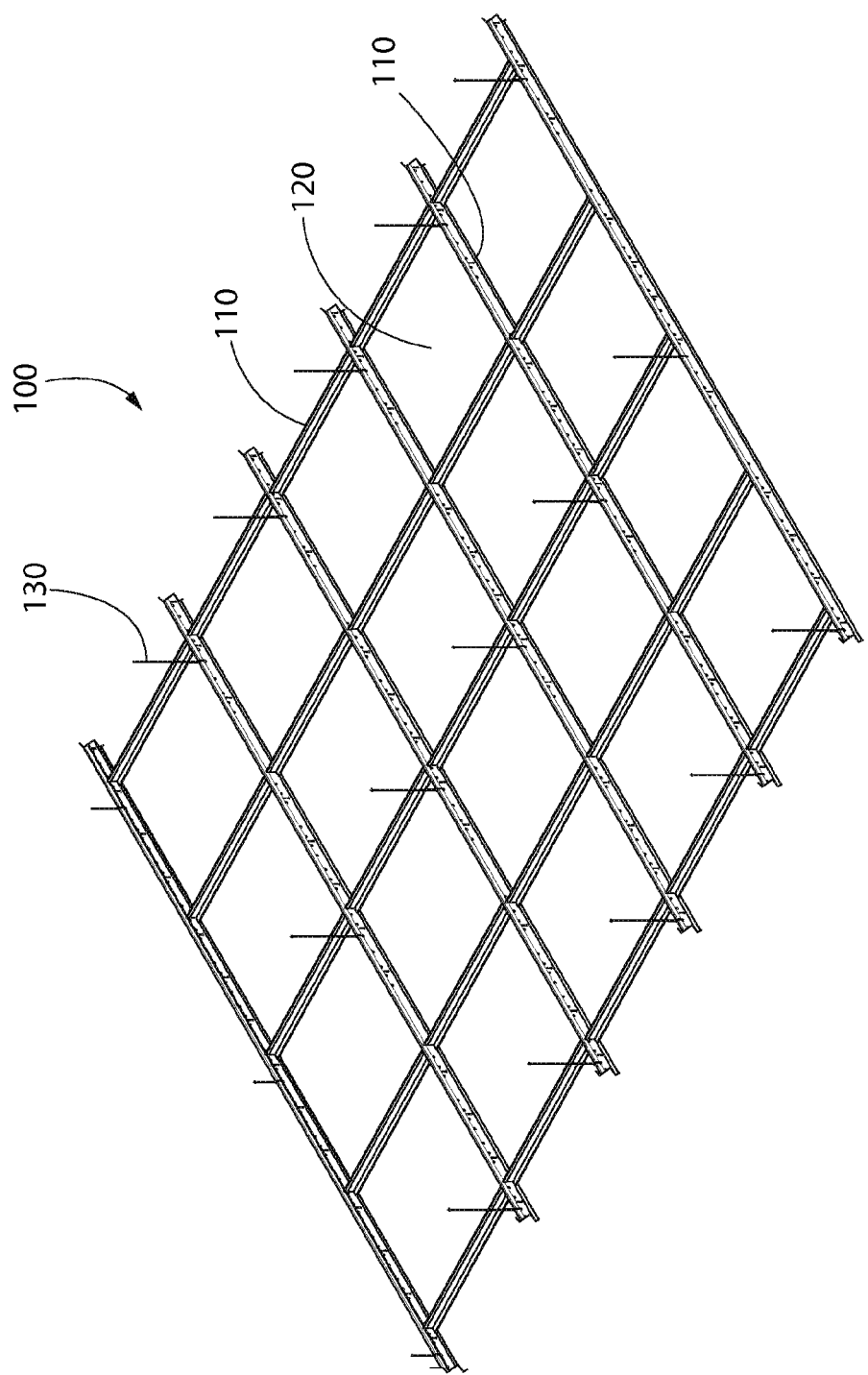
FIG. 3 is a perspective view of a ceiling system including a suspended support grid formed by intersecting grid support members.

FIG. 3 shows an exemplary ceiling system 100 that includes an overhead grid support system forming a ceiling support structure for mounting a plurality of ceiling tiles or panels. In one embodiment, ceiling system 100 may be configured for mounting in a suspended manner from an overhead building structure via appropriate hanger elements 130, such as for example without limitation fasteners, hangers, wires, cables, rods, struts, etc. Ceiling system 100 defines a support grid comprising a plurality intersecting longitudinal and lateral grid support members 110.

In one embodiment, grid support members 110 may be horizontally oriented when installed. It will be appreciated, however, that other suitable mounted orientations of grid support members 110 such as angled or sloped (i.e. between 0 and 90 degrees to horizontal) may be used. Accordingly, although grid support members 110 may be described in one exemplary orientation herein as horizontal, the invention is not limited to this orientation alone and other orientations may be used.

Longitudinal and lateral grid support members 110 intersect to form an array of grid openings 120 which receive and essentially are closed by ceiling tiles or panels when positioned within the openings. In some embodiments, grid support members 110 may be arranged in an orthogonal pattern wherein the support members intersect at right angles (i.e. perpendicular) to form rectilinear grid openings 120 such as squares or rectangles. In some embodiments, grid support members 110 may be arranged in an triangular pattern wherein the support members intersect at obtuse and acute angles to form triangular grid openings 120.

Grid support members 110 may be made of any suitable metallic or non-metallic materials structured to support the dead weight or load of ceiling panels without undue deflection. In some non-limiting embodiments, the grid support members may be made of metal including aluminum, titanium, steel, or other. In some non-limiting embodiments, the grid support members 110 may be a standard heavy duty $15/16$ inch aluminum T-rail having a $15/16$ inch grid face or $9/16$ inch T-rail having a narrow $9/16$ inch grid face. Other types of grid support members may be used preferably with a sufficiently sized grid face for properly fastening or attaching the ceiling panels thereto.

Features of the ceiling panels mountable on the foregoing ceiling support grid, and other support structures, will now be described in further detail.

Ceiling panels may include grid-concealment features in one embodiment being configured and dimensioned to hide or conceal at least a portion of the ceiling support surface or grid face when mounted to grid support members 110 of ceiling system 100. Accordingly, ceiling panels may be used to provide a monolithic ceiling appearance which substantially hides the ceiling support or grid surface when viewed from the occupied building space created below. In other embodiments, an intentionally visible gap may be provided between adjoining ceiling panels when hung to reveal a portion of the grid face.

Figure 4:
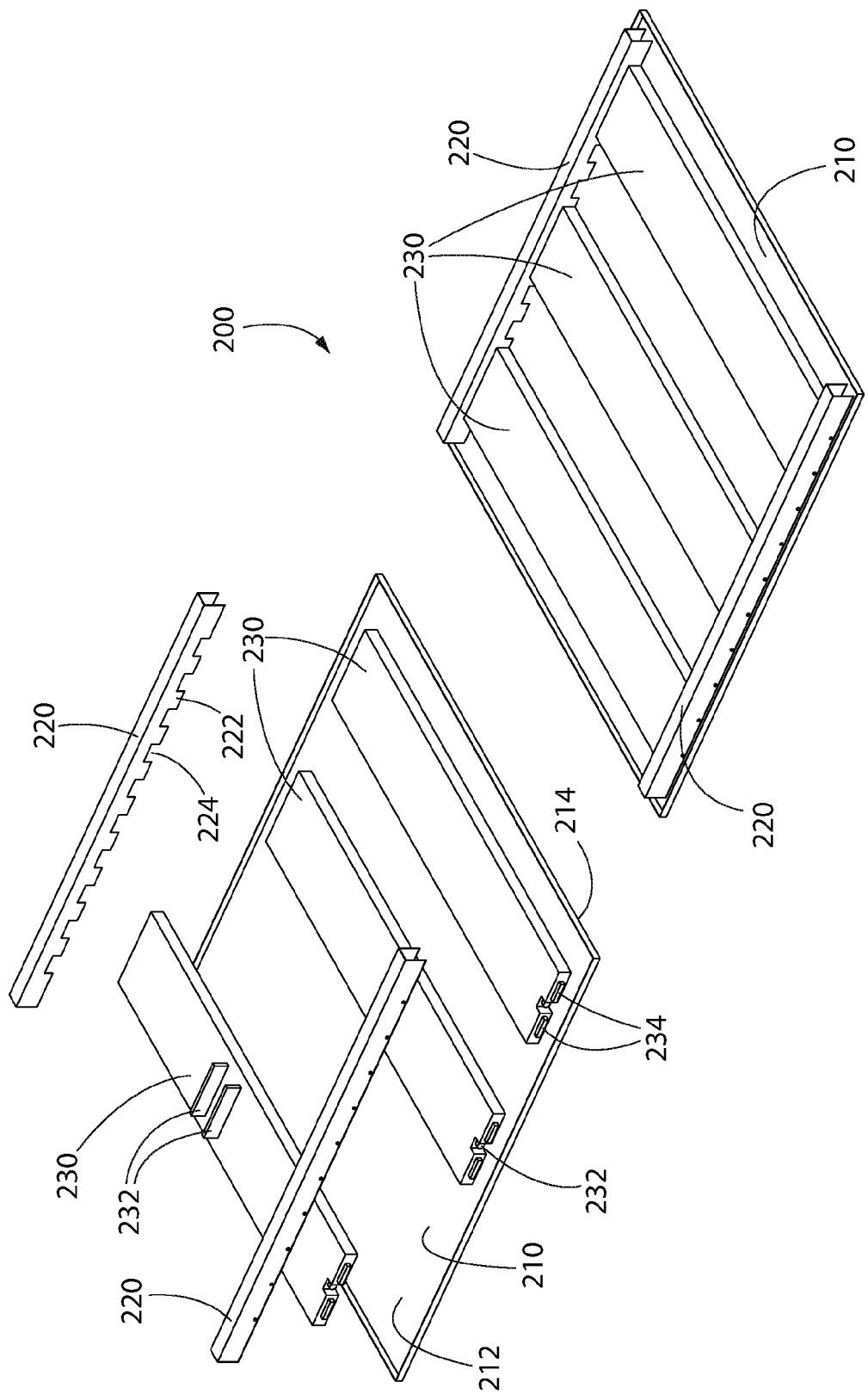
FIG. 4 is a perspective view of a ceiling panel in an assembled state and in a partially assembled state.

Referring now to FIG. 4, a ceiling panel 200 in accordance with embodiments of the invention may have a generally flat body with a substantially greater horizontal width and length than vertical thickness. A basic component of ceiling panel 200 is, in this example, a flat ceiling panel structure 210 with a small upturned edge treatment. Ceiling panel structure 210 has a first surface 212 and a second surface 214 that is opposite first surface 212. Ceiling panel structure 210 is shown in this example as being square. Ceiling panel structure 210 can, for example, be 600 mm by 600 mm. Ceiling panel structure 210 can alternately be any other size or shape supported by the ceiling grid being used.

FIG. 4 shows ceiling panel 200 having three containers 230 that, in this example, contain a phase change material that changes from a solid to a liquid as it absorbs heat from ceiling panel structure 210. In other embodiments, containers 230 contain a phase change material that changes from a liquid to a gas as it absorbs heat from ceiling panel structure 210. While this example shows three containers 230, fewer or more containers can be used on each ceiling panels 200. Each container 230 has a filling port 232 through which the phase change material can be introduced to and/or removed from container 230. While this example shows one filling port 232 on each container 230, each container 230 can have more or less than one filling port 232. Ceiling panel structure 210 can be a perforated metal such as, for example, steel, to provide excellent thermal transfer between the air of the occupied space and container 230. In other embodiments, ceiling panel structure 210 can be non-perforated. In other embodiments, ceiling panel structure 210 can be an acoustic in-fill board, or other non-metallic material. In other embodiments, ceiling panel structure can be aluminum or other metal.

An example of an appropriate phase change material is a salt hydrate phase change material composed of water mixed with calcium chloride and a nucleating agent. Non-limiting examples of appropriate nucleating agents include silica dust, quartz, or combinations thereof. The nucleating agents may have a particle size of about 4 microns to about 2,000 microns—including all values and sub-ranges there-between. This phase change material can have, for example, a latent storage of about 175 J/g and a transition temperature in the range of 16° C. to 30° C. Examples of other phase change materials are paraffin, and other salt hydrates. However, other types of phase change material can also be used. Paraffin phase change materials are relatively heavy and, as a result, require a stronger support structure and possibly a stronger ceiling panel structure. Some embodiments of the invention use salt hydrate phase change material as it provides a high latent energy storage for a given weight and cost.

Container 230, in the example shown in FIG. 4, has two protrusions 234 on each end of container 230 for engaging with an engagement feature of a mounting system that holds container 230 in position on ceiling panel structure 210.

One of the containers 230 in this example is shown having two fins 232 on the outside of container 230. Fins 232, or other external protrusions or surface features, can be included to increase the heat transfer between container 230 and the surrounding air. Although two fins 232 are shown in this example, more or fewer fins can be used. In addition, the configuration of fins 232 are only exemplary and other fin configurations can be used.

The mounting system used in this example includes two mounting rails 220, one located at each end of containers 230. In this example, each mounting rail 220 has a series of teeth 222 which form openings 224. Protrusions 234 engage openings 224 in mounting rails 220 to secure containers 230 in the desired positions. In some embodiments, mounting rails 220 are fixed to ceiling panel structure 210 and containers 230 are snapped into place by slightly bending containers of 230 while inserting protrusions 234 into openings 224. Mounting rails 220 can be fixed to ceiling panel structure 210 by, for example, spot welding or mechanical staking, as well as by an adhesive or snapped into place with tabs and slots. In other embodiments, one or both of mounting rails 220 are attached to ceiling panel structure 210 after containers 230 are in the desired positions. In these embodiments, mounting rails 220 can be permanently fixed to ceiling panel structure 210, or can be detachably mounted to ceiling panel structure 210. In the case of mounting rails 220 being detachably mounted to ceiling panel structure 210, a snap or other friction fit, a threaded fastener, or other appropriate fastener can be used. In some embodiments, mounting rails 220 use a slide-lock attachment in which the rail is moved horizontally to engage and lock with tabs extending from ceiling panel structure 210. In preferred embodiments, the mounting system locks containers 230 in place longitudinally, laterally, and vertically so that containers 230 cannot move relative to ceiling panel structure 210. In preferred embodiments, the mounting system biases containers 130 against ceiling panel structure 210 to facilitate thermal transfer between container 230 and ceiling panel structure 210.

Figure 5:
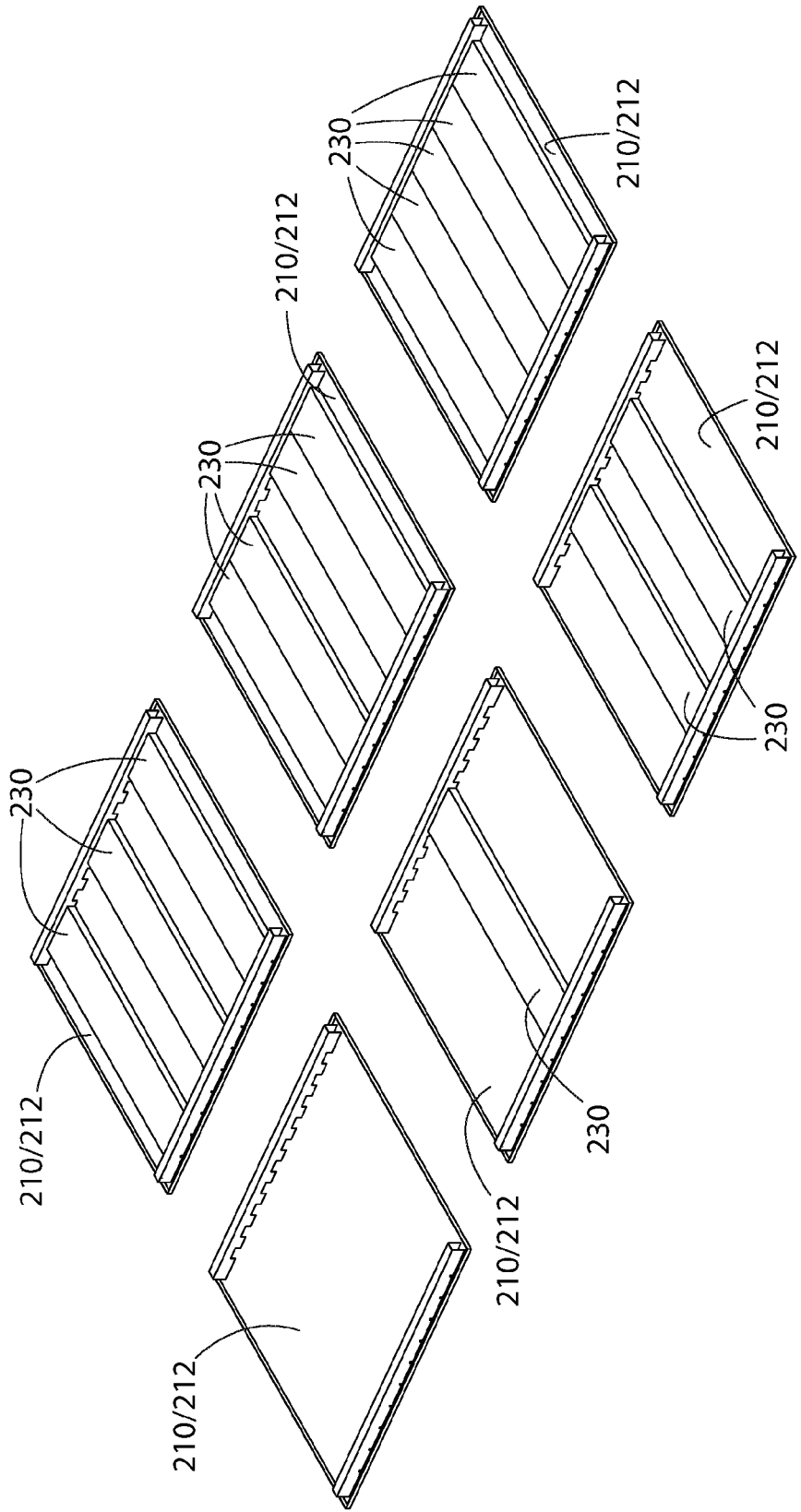
FIG. 5 is a perspective view of a ceiling panel having either zero, one, two, three, four or five containers mounted thereon.
Figure 8:
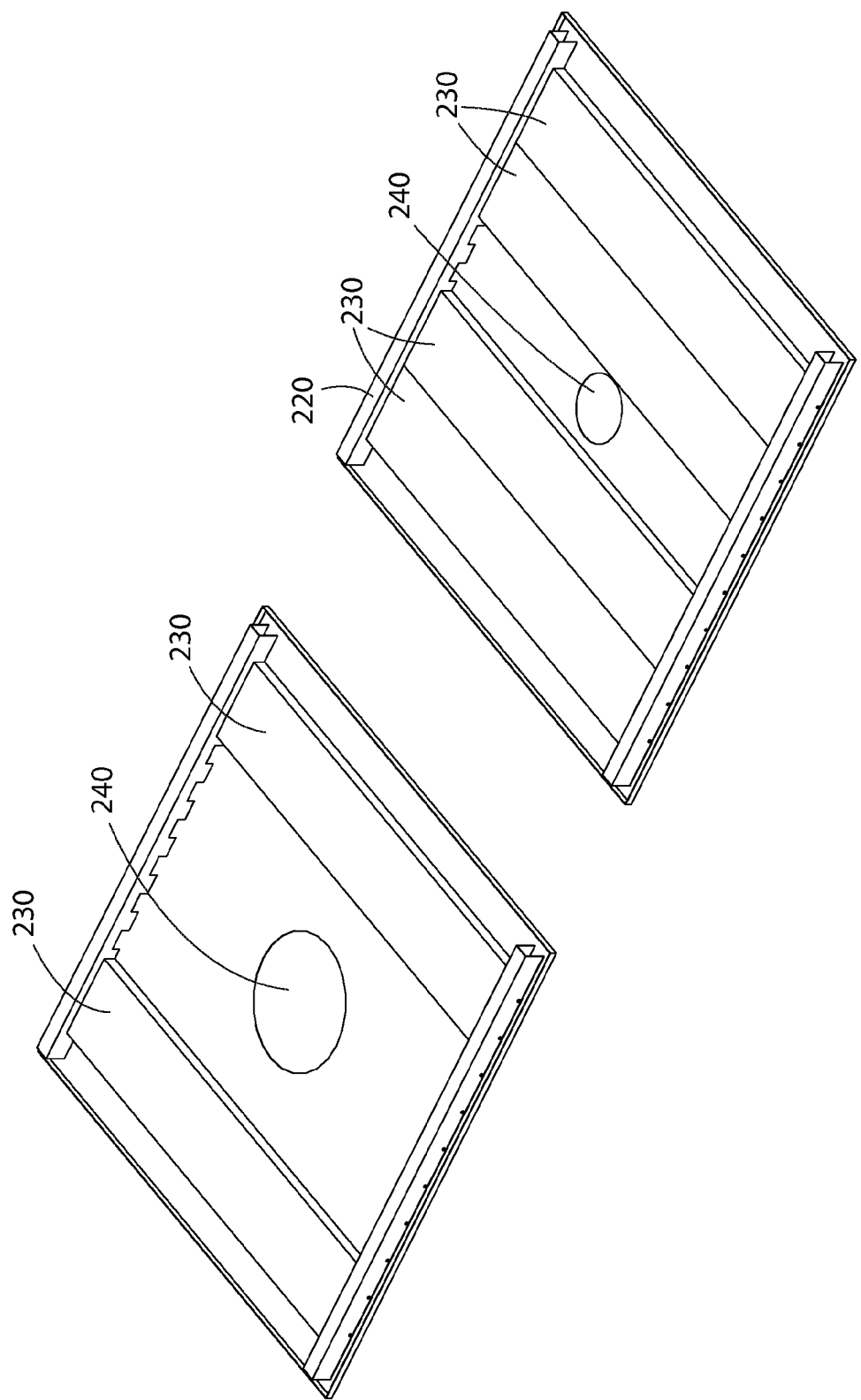
FIG. 8 is a perspective view of a ceiling panel having a hole in the panel and either two or four containers.

In the example shown in FIG. 4, the three containers 230 are evenly spaced on ceiling panel structure 210. FIG. 5 shows examples of zero, one, two, three, four, and five containers 230 mounted to ceiling panel structure 210. This figure illustrates the adaptability of embodiments of the invention. It is noted that since containers 230 are removably mounted, the number and position of containers 230 can easily be changed it the installation location. For example, after the initial installation, the number and position of containers 230 can be changed to adapt to changing conditions and/or fine tuning of the energy storage plan. Various criteria can influence the optimum number of containers 230 for any given situation. For example, the desired thermal energy storage can be influenced by the location of the particular ceiling panel relative to heat sources such as, for example, windows, door openings, and HVAC outlets. Also, an obstruction either in the space above the ceiling panel or that pierces the ceiling panel, such as a light fixture or a sprinkler head, can require a certain placement of containers 230. Two examples of such an obstruction are shown in FIG. 8, where a hole 240 in ceiling panel structure 210 requires that containers 230 be located at positions other than the above hole 240. Hole 240 can be, for example, for receiving a light fixture or a sprinkler head.

Figure 6:
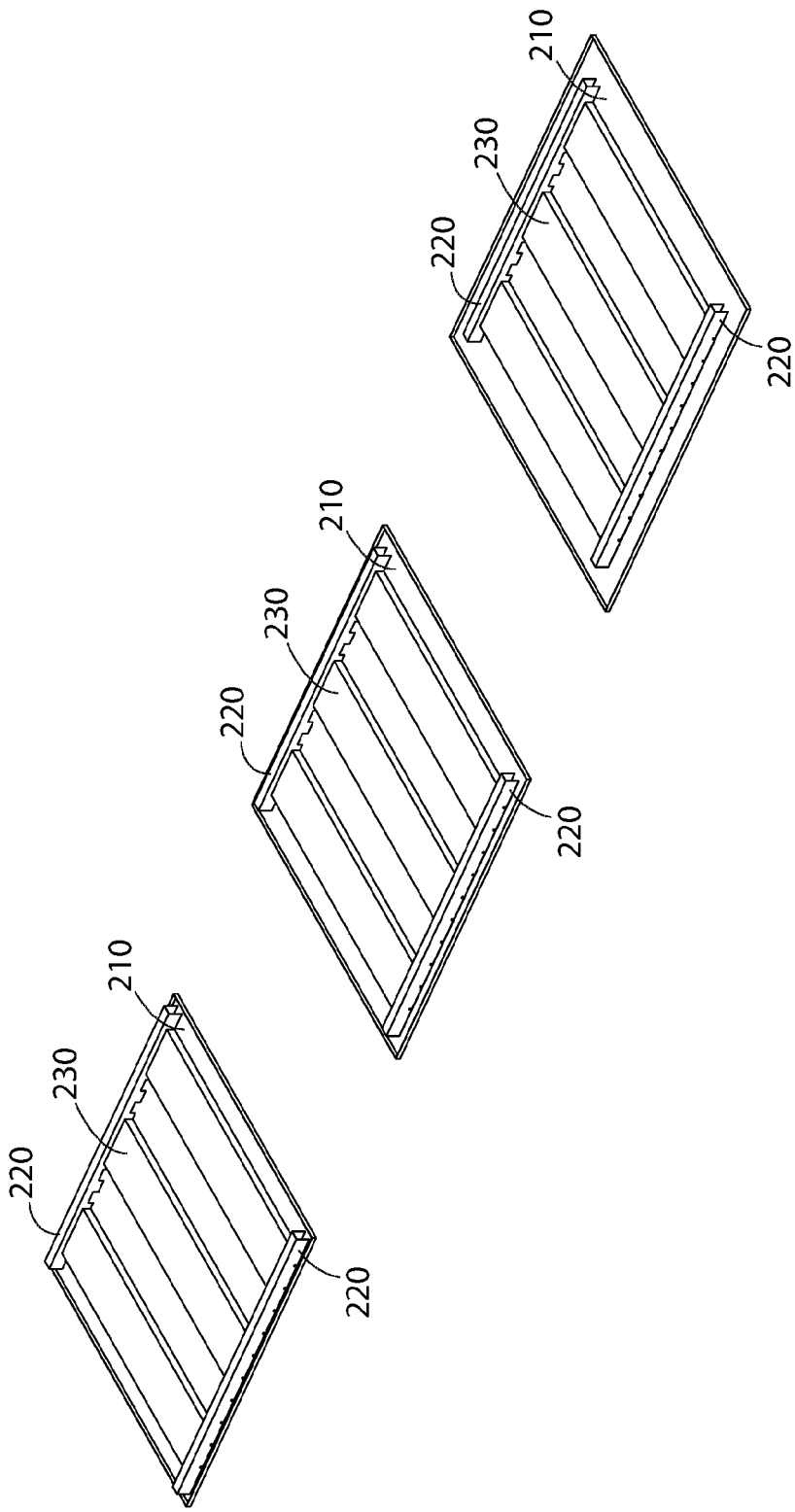
FIG. 6 is a perspective view of ceiling panels of different sizes using the same mounting system and containers.
Figure 7:
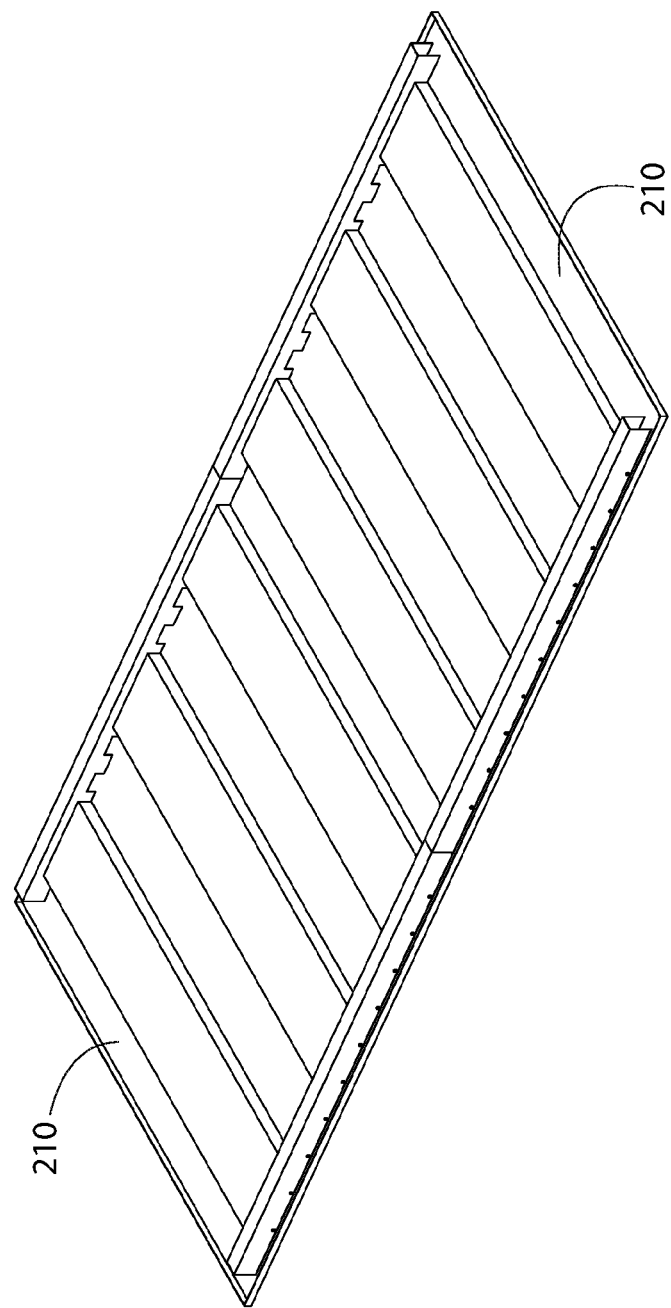
FIG. 7 is a perspective view of two ceiling panels adjacent each other.

The exemplary mounting structure and container arrangement discussed above can be used on ceiling panels structures of different sizes. For example, as shown in FIG. 6, mounting rails 220 and containers 230 of the size shown in FIG. 4 can be mounted to ceiling panel structures 210 that are larger than that shown in FIG. 4. This permits the use of standard size components with a multitude of different ceiling panels. As shown in FIG. 7, two (or more) standard size mounting rail sets and associated containers can be used on a ceiling panels structure that is larger than that shown in FIG. 4.

Figure 9:
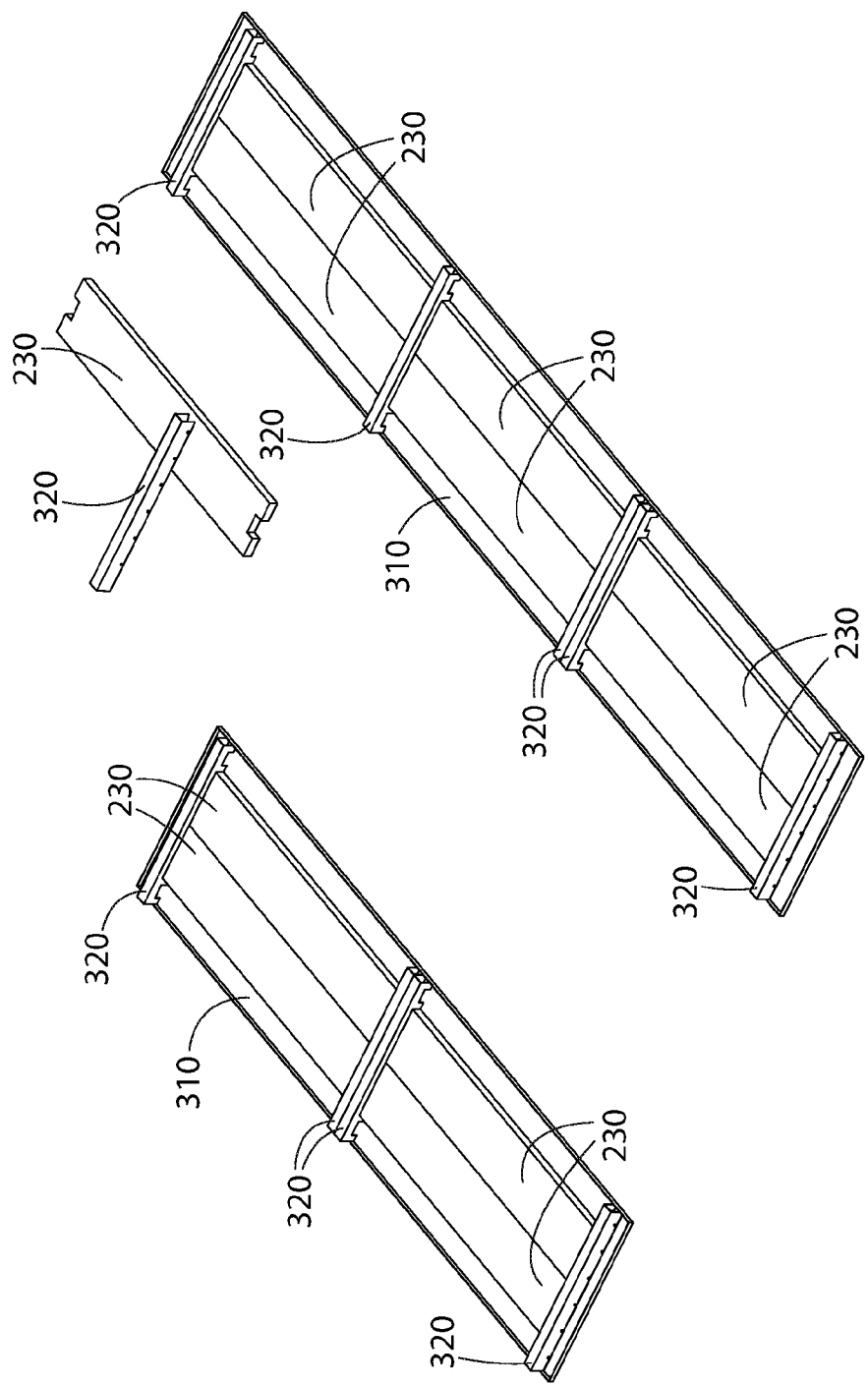
FIG. 9 is a perspective view of panels for use in a plank ceiling systems.

In addition to the drop-in type ceiling panel shown in the examples above, other types of ceiling systems can benefit from embodiments of the invention. For example, FIG. 9 shows a plank ceiling system using mounting rails 320 to hold containers 230 to a ceiling panel structure 310. Containers 230 used in these examples can be the same containers as used in the previous examples. These containers 230 can be the same size or different size as the containers shown in the previous examples. As with the previous examples, mounting rails 320 used in FIG. 9 can be fabricated to the proper length in the factory, or can be cut from a longer length in the field.

Figure 10:
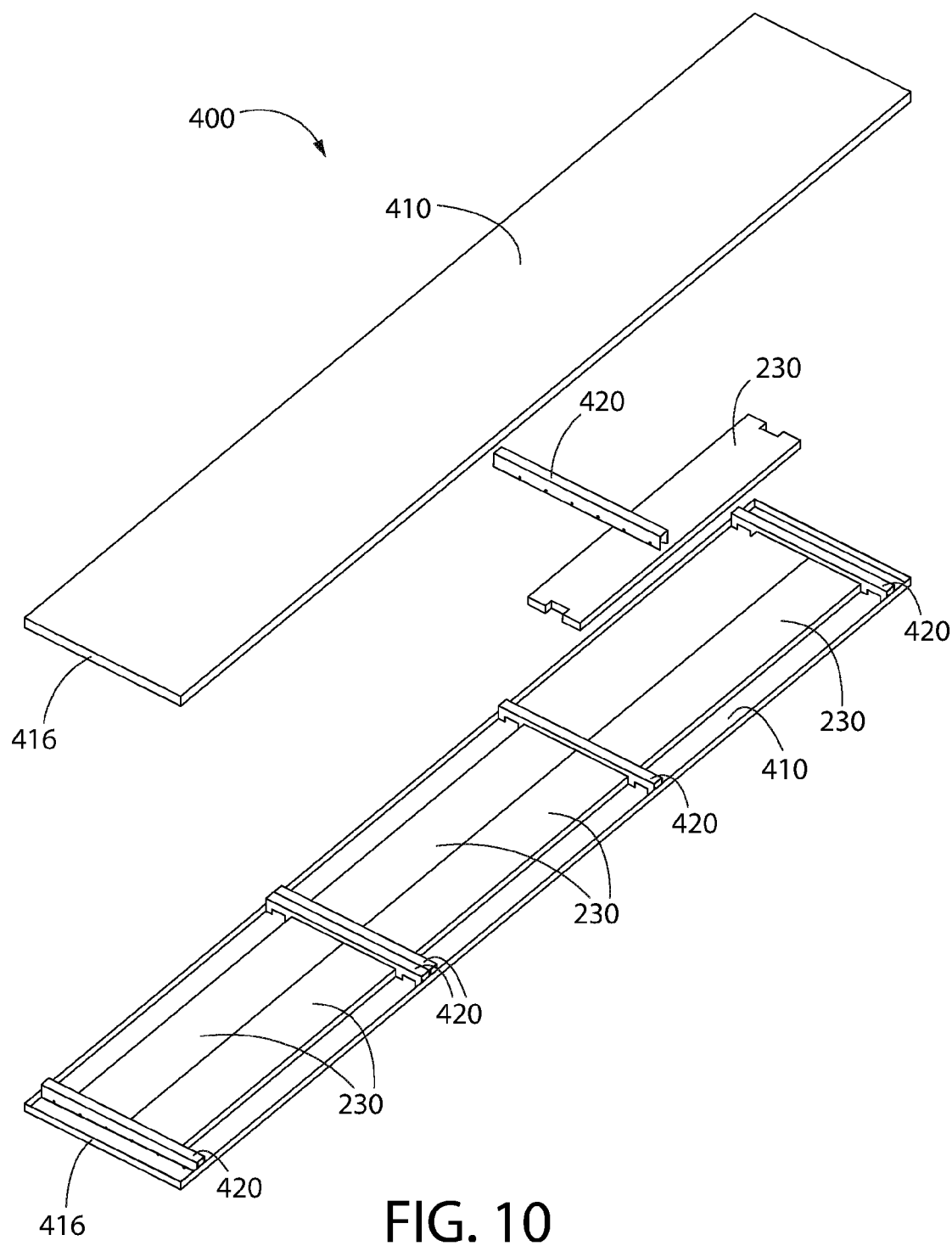
FIG. 10 is a perspective view of a panel for use in a baffle type ceiling system.

Another type of ceiling system to which embodiments of the invention can be applied is the baffle type ceiling system. An example of a baffle type ceiling in accordance with the invention is shown in FIG. 10. In this example, multiple mounting rails 420 hold a plurality of containers 230 in position between two ceiling panel structures 410. A lip 416 on each ceiling panel structure 410 hides mounting rails 420 and containers 230 from view when the panel is assembled and in use. These containers 230 can be the same size or different size as the containers shown in the previous examples. As with the previous examples, mounting rails 420 used in FIG. 10 can be fabricated to the proper length in the factory, or can be cut from a longer length in the field.

In some embodiments, thermal insulation is placed directly on the side of the container that is opposite the room side (on top in the case of a ceiling) of some or all of the containers in order to force all or substantially all of the heat transfer through the room side of the panel. In some embodiments, the thermal insulation may have an intermediate material between it and the container. The insulation can, for example, be placed directly on top of containers 230 in FIG. 10 and below the upper ceiling panel structure 410. Or upper ceiling panel structure 410 can itself be a thermally insulating material. Thermal insulation can also be added to any other embodiments, including all of those embodiments shown or described. Thermal insulation has been found to be particularly beneficial in ceiling arrangements that use a duct to contain the air that is returned to the heating/cooling equipment. In such arrangements, the air in the plenum space is not circulated through the heating/cooling equipment and back to the occupied space, so heat transferred from the phase change material in the containers to the air in the plenum space is wasted. In contrast, in an unducted return system the air in the plenum space is returned to the heating/cooling equipment so heat transferred from the phase change material to the air in the plenum space is eventually recirculated to the occupied space.

Figure 11:
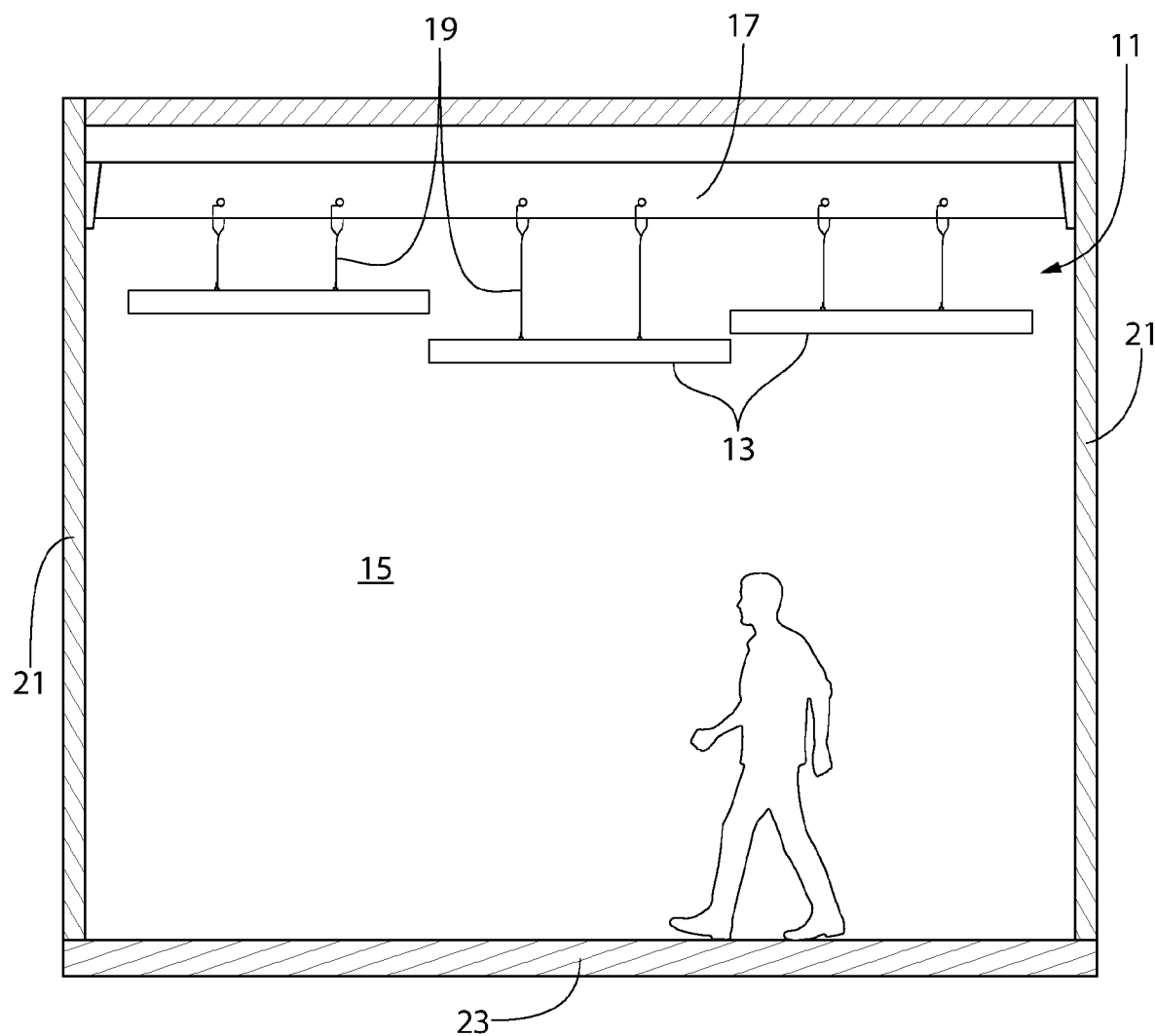
FIG. 11 is a side view of an occupied space having a canopy type ceiling system.
Figure 12:
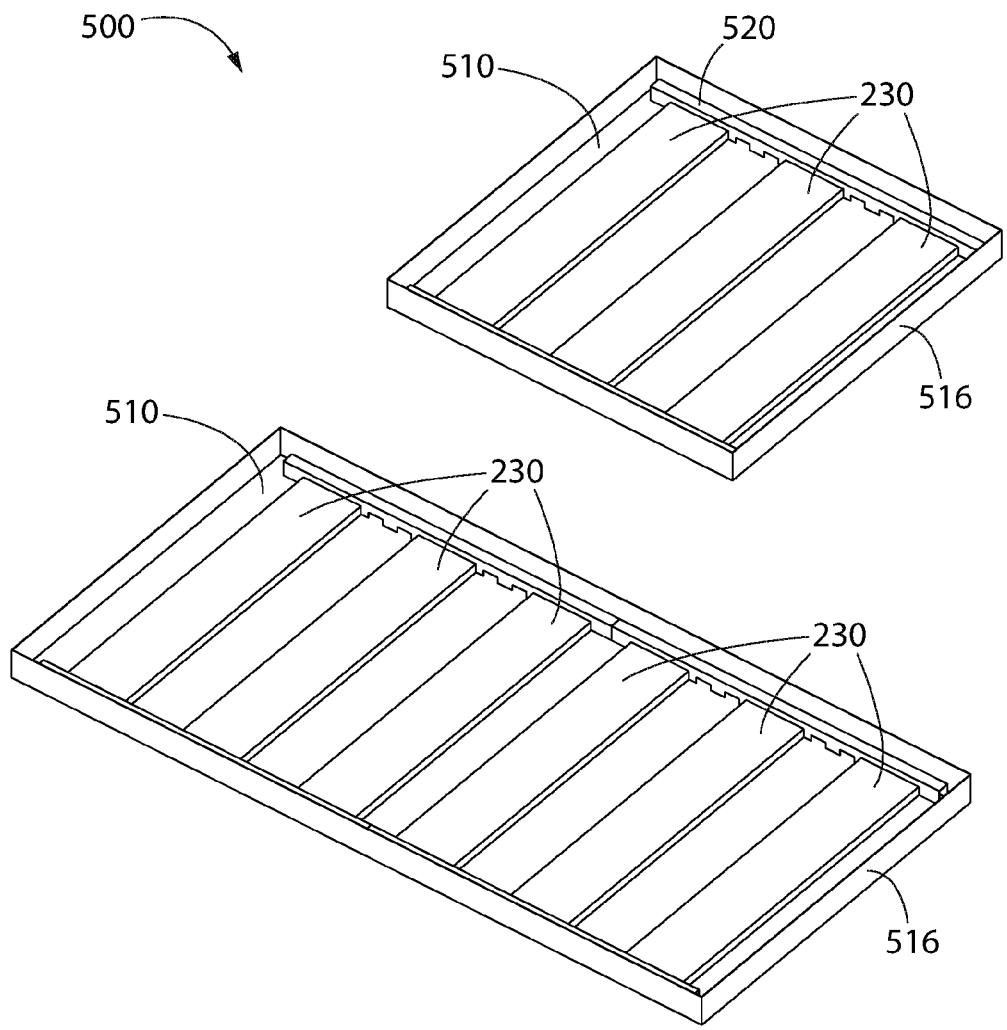
FIG. 12 is a perspective view of panels for use in a canopy type ceiling system.

Yet another type of ceiling system to which embodiments of the invention can be applied is the canopy type ceiling system. A canopy type ceiling system is a ceiling system which includes a ceiling structure suspended from an overhead structure, such that the ceiling structure can provide, in some examples, a seamless visual appearance and offer the ability to fine tune the acoustic properties and/or thermal storage properties of the ceiling system without altering or affecting the overall visual appearance. The seamless visual appearance can be achieved by stretching a single sheet of fabric across an entire ceiling structure, which may be formed of a frame, may include a grid of ceiling panels, and may be suspended from an overhead structure within a space free from direct attachment to walls or other similar ceiling structures. FIG. 11 shows examples of canopy type ceiling systems. In FIG. 11 an occupied space 15 has a floor 23 and walls 21. Canopies 13 hang from wires, rods, or other hangers 19 that are attached to a structural member 17. A space 11 exists between canopies 13 and structural member 17. An example of a canopy in accordance with the invention is shown in FIG. 12. As with the previous examples, mounting rails 520 hold containers 230 in position on a ceiling panel structure 510. A lip 516 surrounds the perimeter ceiling panel structure 510 to conceal mounting rails 520 and containers 230. These containers 230 can be the same size or different size as the containers shown in the previous examples. As with the previous examples, mounting rails 520 used in FIG. 12 can be fabricated to the proper length in the factory, or can be cut from a longer length in the field.

As can be seen from the examples describe so far, a standard size container 230 containing phase change material can be mounted to various types of ceiling panels using a standardized rail system. These embodiments provide flexibility that was unknown prior to the invention and allow tradesmen in the field to adapt the ceiling installation to the desired thermal storage for a particular location. Particular embodiments also permit future reconfiguration of containers 230 to modify the overall thermal storage layout for the particular ceiling installation.

Figure 13:
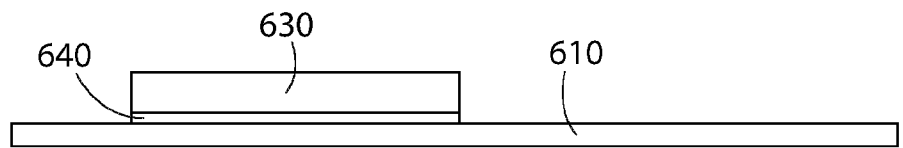
FIG. 13 is a side view of a container coupled to a ceiling panel structure by a thermally conductive adhesive.

FIG. 13 shows an example of an embodiment of the invention in which a thermally conductive adhesive 640 is placed between a container 630 and a ceiling panel structure 610. Several factors, including, for example, slight imperfections in the lower surface of container 630 and/or the upper surface of ceiling panel structure 610, or container 630 not being pressed sufficiently into contact with the upper surface of ceiling panel structure 610 can negatively impact the thermal transfer between containers 630 and ceiling panel structure 610. Thermally conductive adhesive 640 can bridge gaps between the lower surface of container 630 and the upper surface of ceiling panel structure 610 to improve thermal transfer between the two. Non-limiting examples of appropriate thermally conductive adhesives include compressible expanded graphite sheets. These and other examples of thermally conductive adhesives can have a coefficient of thermal conductivity of between about 0.5 W/mC to about 3.0 W/mC—including all values and sub-ranges there-between. Non-limiting example of thermally conductive adhesive include thermally conductive epoxy having a thermal conductivity ranging from about 0.8 to about 1.4 W/mC. Thermally conductive greases may also be used—such as aluminum filled pastes having a thermal conductivity of about 1.7 W/mC.

In some embodiments, thermally conductive adhesive 640 mechanically bonds container 630 to ceiling panel structure 610. In some embodiments, thermally conductive adhesive 640 is the only structure that mechanically bonds container 630 to ceiling panel structure 610. In other embodiments, thermally conductive adhesive 640 is used in conjunction with the mounting rails shown in the description of other embodiments, or other appropriate mounting systems.

In addition to materials that provide structure bonding, the term "adhesive" as used in this specification includes materials that stay in gel or paste form and/or materials that conform to the shape of the container and provide conformal contact, while only providing a minimum bonding or mechanical coupling effect.

Figure 14:
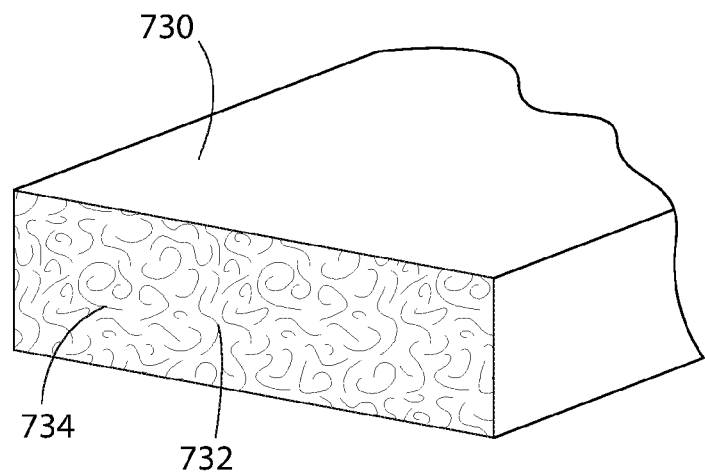
FIG. 14 is a perspective sectional view of a container having thermally conductive elements inside the container.

FIG. 14 shows an example of an embodiment in which thermally conductive elements 734 are mixed into the phase change material 732 in container 730. Thermally conductive elements 734 preferably have a greater thermal conductivity than that of phase change material 732. As a result, heat can be conducted more quickly through thermally conductive elements 734 and therefore distributed more quickly in phase change material 732. Thermally conductive elements 734 can be, for example, fibers or shards such as, for example, silica or aluminum fibers or shards, as well as glass fibers. Any appropriate material that has a greater thermal conductivity than phase change material 732 can be used as thermally conductive elements 734.

Figure 15:
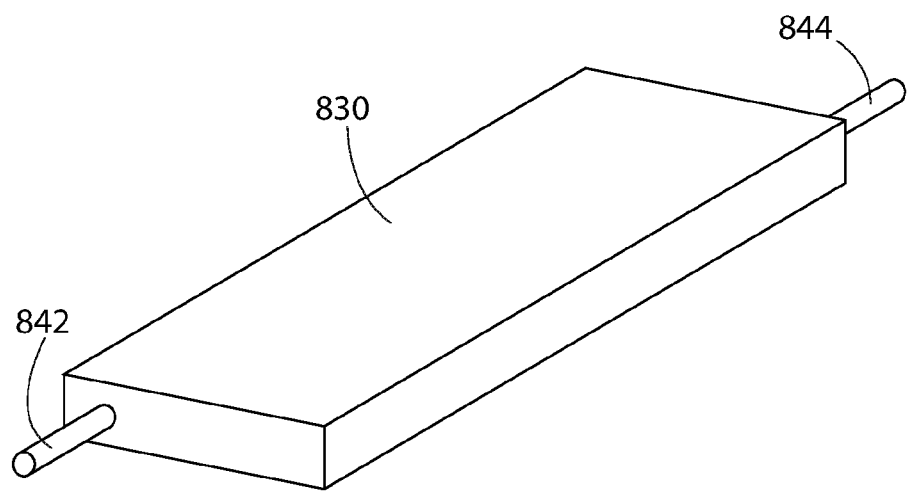
Figure 16:
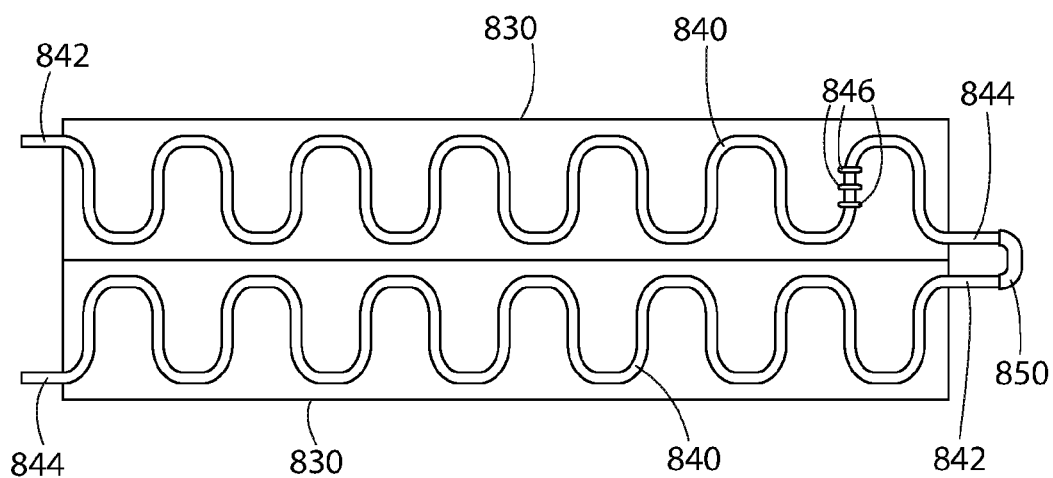

FIGS. 15 and 16 show an embodiment which uses an outside fluid to transfer thermal energy to and/or from the phase change material inside container 830. In this example, a fluid conduit 840 runs through the phase change material inside container 830. A fluid inlet 842 and a fluid outlet 844 are used to introduce and remove fluid from fluid conduit 840. For example, a fluid having a temperature less than the temperature of the phase change material can be run through fluid conduit 840 to change the phase of the phase change material from gas to liquid or from liquid to solid. Conversely, a fluid having a temperature greater than the temperature of the phase change material can be run through fluid conduit 840 to change the phase of the phase change material from solid to liquid or from liquid to gas. Changing the phase of the phase change material can facilitate the desired thermal transfer from the space below the ceiling tile through the ceiling panel structure and container 830 to the phase change material.

The example in FIG. 16 shows several fins 846 on fluid conduit 840. Fins 846, or other surface treatments of fluid conduit 840, can increase the thermal transfer between the phase change material and the fluid inside fluid conduit 840.

Figure 17:
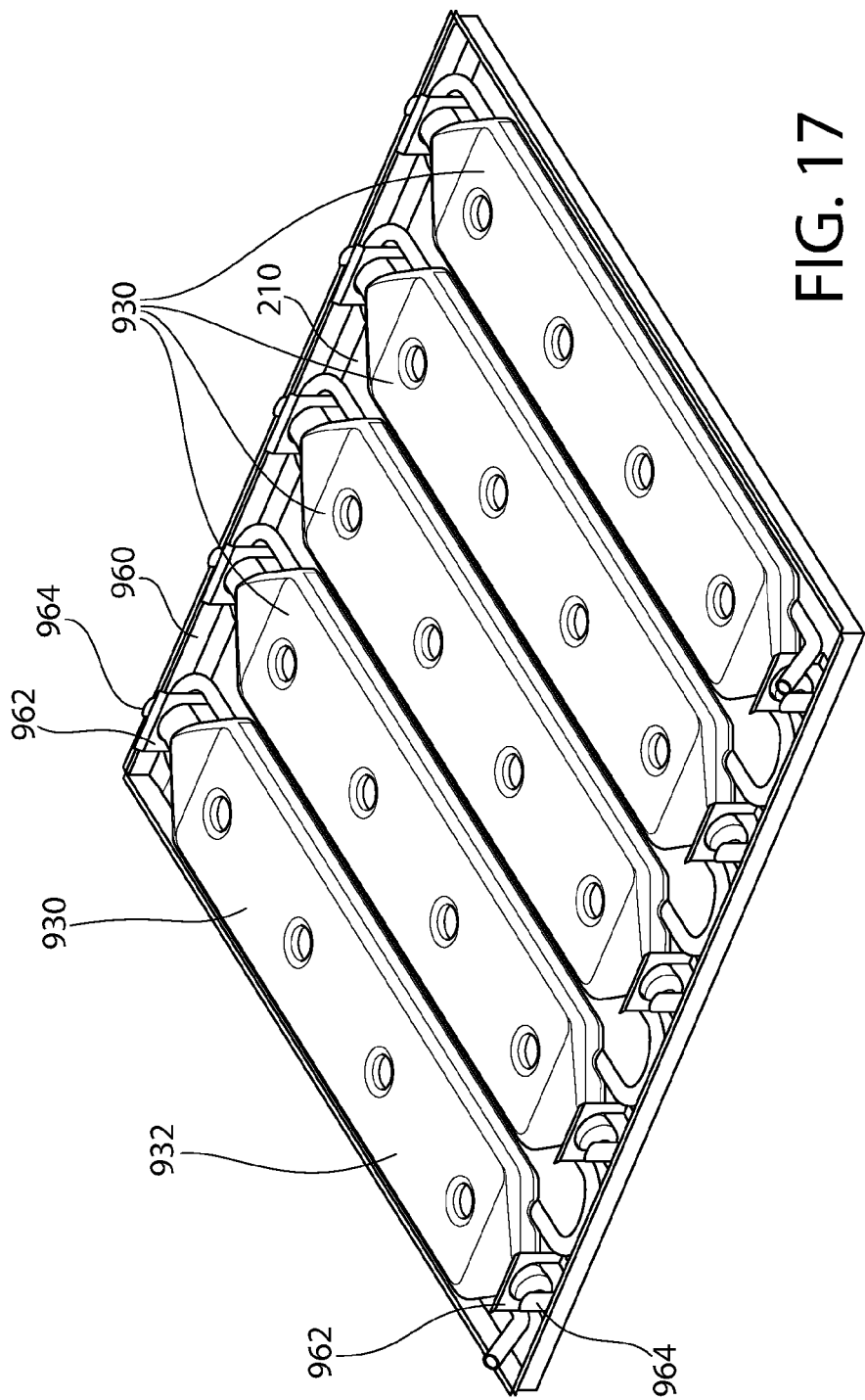
FIG. 17 is perspective view of an embodiment of the invention.
Figure 18:
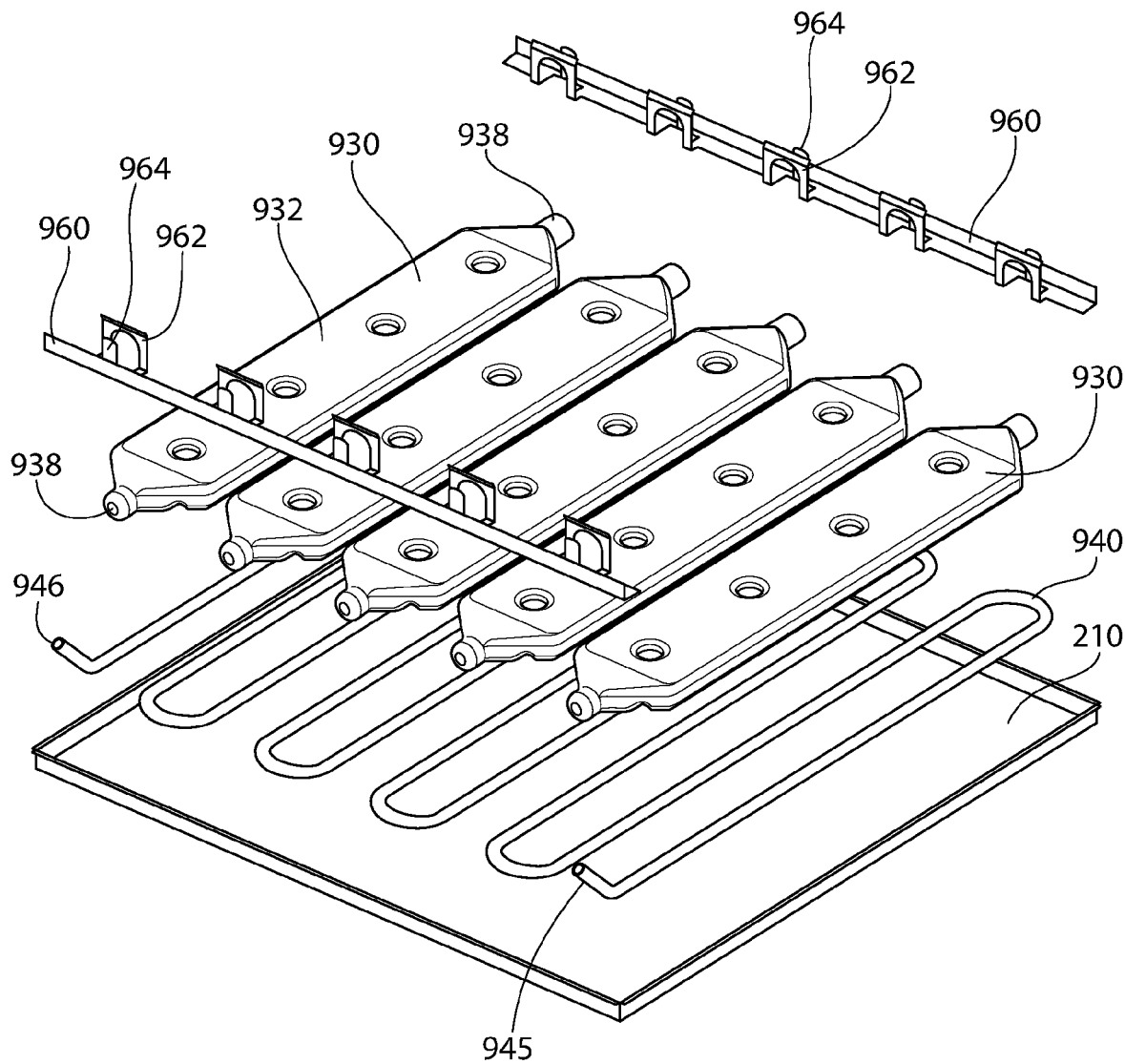
FIG. 18 is an exploded view of the embodiment shown in FIG. 17.

FIGS. 17-20 shown another example of an embodiment that uses an outside fluid to transfer thermal energy to and/or from the phase change material inside container 930. In this example, a conduit 940 that carries the outside fluid is separate from container 930 and transfers thermal energy through the skin of container 930. FIG. 17 shows a plurality of containers 930. This example shows five containers, but more or fewer containers can also be used. Containers 930 are positioned on ceiling panel structure 210 in whatever configuration is appropriate for the particular installation. FIG. 18 shows the embodiment of FIG. 17 in an exploded view in order to better show the individual components. In this example, five containers 930 are held in place on panel structure 210 by two mounting rails 960. In this example, each mounting rail 960 has a containment bracket 962 and a holding member 964 for each container 930. Containment bracket 962 can prevent container 930 from moving away from ceiling panel structure 210 while holding member 964 can press against ends of container 930. In this example, container 930 is pinched between one holding member 964 on each end. Holding members 964 are springs in this example to exert the pinching force on container 930. Other type of holding members can also be used to hold container 930 in place. Containment bracket 962 can also serve as a positioning guide and/or a holding feature for conduit 940 that contains the outside fluid. While containment brackets 962 and holding members 964 are shown in this example as integral with mounting rails 960, it is noted that one or both of containment brackets 962 and holding members 964 can be separate pieces from mounting rails 960.

FIG. 18 shows conduit 940 that carries the outside fluid in a winding pattern so that it can be in contact with containers 930 over a large contact area. Conduit 940 is shown with one inlet 945 and one outlet 946, however, more inlets and/or outlets can be supplied. For example, each container 930 can have a dedicated conduit having its own inlet and outlet, or some containers 930 can share a first conduit while others share a second conduit. For example, the first, third and fifth containers can share one conduit while the second and fourth containers share a second conduit. Different levels of energy transfer can be achieved with combinations of the above alternatives.

Figure 19:
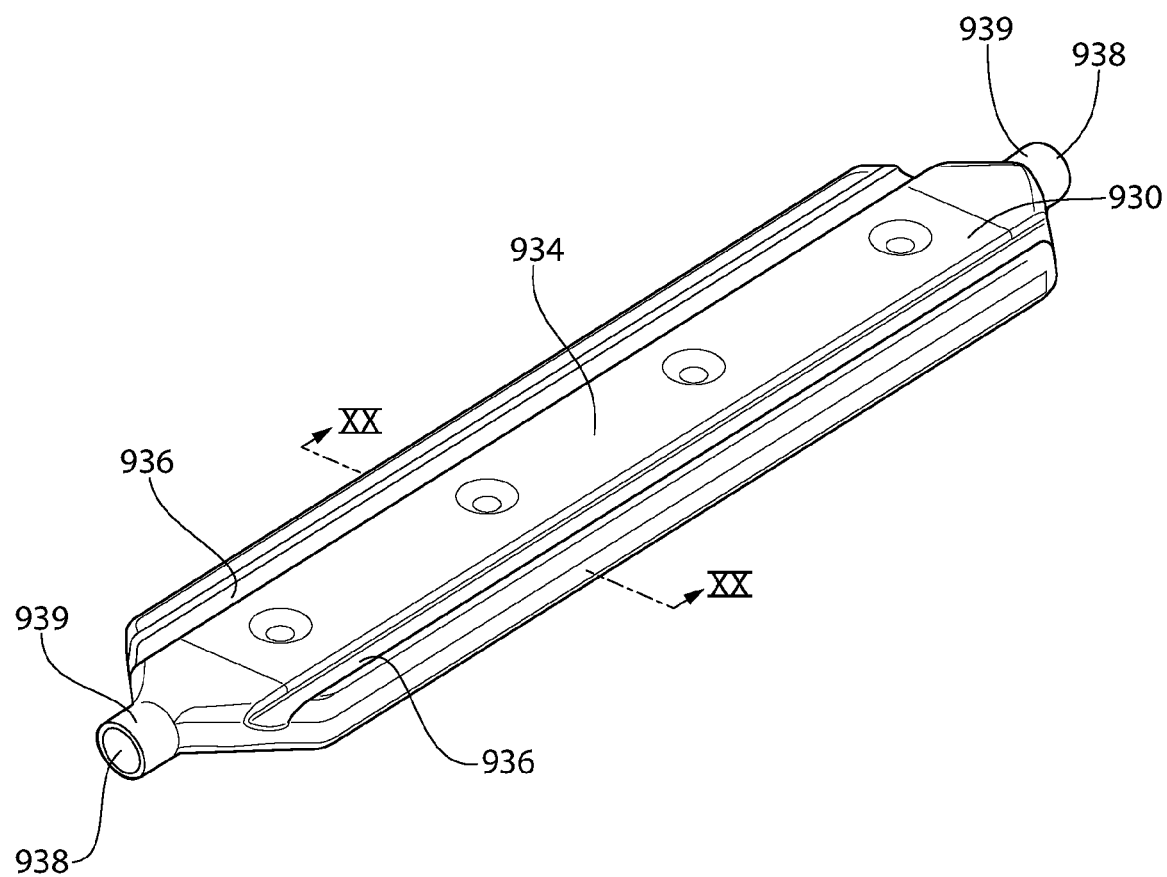
FIG. 19 is a perspective view of a container of the embodiment shown in FIG. 17.

FIG. 19 shows a bottom view of an exemplary container 930. In this view two channels 936 can be seen formed in the bottom 934 of container 930. Channels 936 are configured to accept conduit 940. In some embodiments, channels 936 contact conduit 940 to aid thermal energy transfer. In some embodiments, channels 936 tightly grip conduit 940 to further aid thermal heat transfer and/or to secure conduit 940 in place to avoid potential rattling or other noise generation. At each end of this example of container 930, a plug 938 is provided in an end section 939. Other embodiments have only one plug 938 or no plugs 938. Container 930 can be filled with the phase change material by way of one or both plugs 938. Although this example shows two channels 936, one, three, or more channels can be provided.

Figure 20:
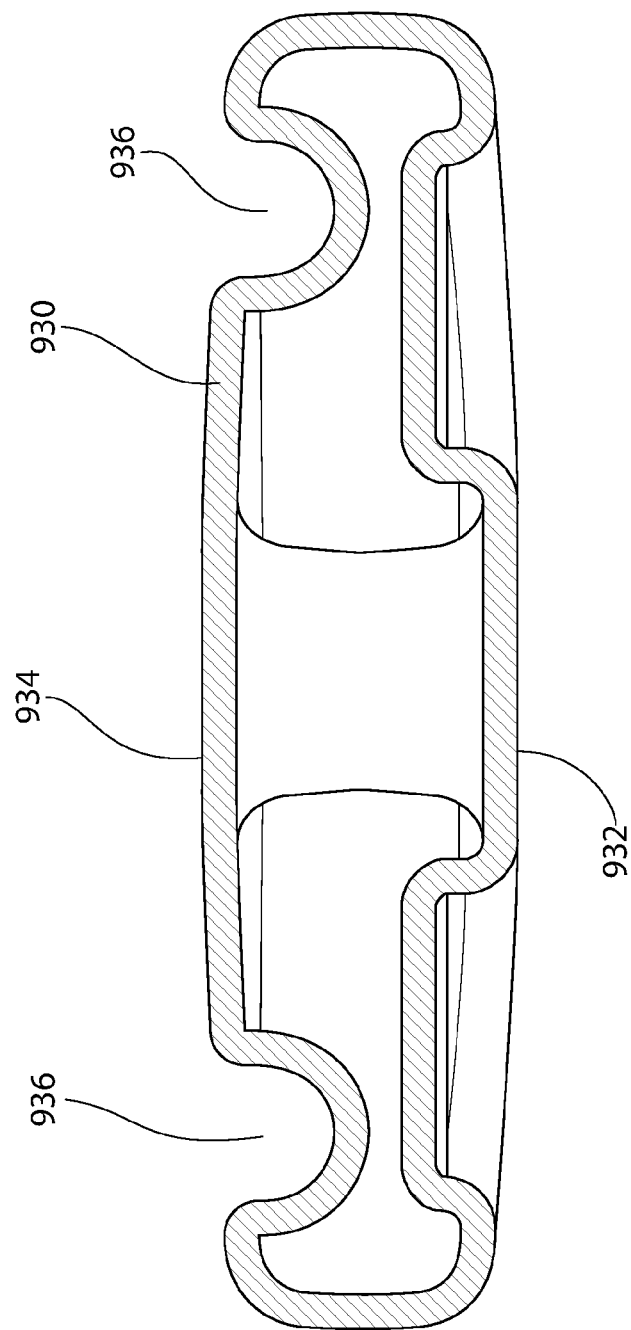
FIG. 20 is a sectional view of the container shown in FIG. 19.

FIG. 20 is a sectional view of container 930 taken along section line XX-XX in FIG. 19.

By running conduit 940 outside of containers 930, if one container 930 is damaged or ruptured, or if an upgraded or different type of container is desired, that one container 930 can be removed and replaced without disturbing conduit 940. For example, containment brackets 962 on both ends of a particular container 930 can be moved in a direction away from each other to allow the ends of container 930 to clear them so that container 930 can be pulled up and away from the panel. Then another container 930 can be inserted into the vacant spot.

Although the examples shown in FIGS. 17 and 18 show conduit 940 positioned between containers 930 and ceiling panel structure 210, it is noted that conduit 940 can be alternatively, or also, located above containers 930.

An embodiment includes ceiling panel structure 210, one or more containers 230 containing a phase change material that comprises water mixed with calcium chloride and a nucleating agent, one or more fins 232 on the exterior of container 230, two mounting rails 220, thermally conductive adhesive 640, thermally conductive elements 734 in the phase change material, and a fluid conduit 840 running through the phase change material.

An embodiment includes ceiling panel structure 210, one or more containers 230 containing a phase change material that comprises water mixed with calcium chloride and a nucleating agent, one or more fins 232 on the exterior of container 230, two mounting rails 220, thermally conductive elements 734 in the phase change material, and a fluid conduit 840 running through the phase change material.

An embodiment includes ceiling panel structure 210, one or more containers 230 containing a phase change material that comprises water mixed with calcium chloride and a nucleating agent, one or more fins 232 on the exterior of container 230, thermally conductive adhesive 640, thermally conductive elements 734 in the phase change material, and a fluid conduit 840 running through the phase change material.

An embodiment includes ceiling panel structure 210, one or more containers 930 containing a phase change material that comprises water mixed with calcium chloride and a nucleating agent, one or more fins 232 on the exterior of container 930, two mounting rails 960, thermally conductive adhesive 640, thermally conductive elements 734 in the phase change material, and a fluid conduit 940 in contact with containers 930.

An embodiment includes ceiling panel structure 210, one or more containers 930 containing a phase change material that comprises water mixed with calcium chloride and a nucleating agent, one or more fins 232 on the exterior of container 930, two mounting rails 960, thermally conductive elements 734 in the phase change material, and a fluid conduit 940 in contact with containers 930.

An embodiment includes ceiling panel structure 210, one or more containers 930 containing a phase change material that comprises water mixed with calcium chloride and a nucleating agent, one or more fins 232 on the exterior of container 930, thermally conductive adhesive 640, thermally conductive elements 734 in the phase change material, and a fluid conduit 940 in contact with containers 930.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A building ceiling panel apparatus comprising:
a panel structure having a first surface and a second surface opposite the first surface;
a mounting system comprising:
a first rail configured to be mounted to the panel structure adjacent to a first edge of the panel structure, the first rail comprising at least one first notch, the at least one first notch comprising a first enclosure surface and a first notch opening, the first enclosure surface facing the first surface when the first rail is mounted to the panel structure; and
a second rail configured to be mounted to the panel structure adjacent to a second edge of the panel structure that is opposite the first edge of the panel structure, the second rail comprising at least one second notch, the at least one second notch comprising a second enclosure surface and a second notch opening, the second enclosure surface facing the first surface when the second rail is mounted to the panel structure; and
at least one container containing a phase change material, the at least one container configured to be positioned on the first surface of the panel structure so that a first end portion of the at least one container is located within the first notch opening of the first rail and is securable to the first surface by the first rail and a second end portion of the at least one container is located within the second notch opening of the second rail and is securable to the first surface by the second rail, wherein the at least one container is configured to be positioned on the panel structure at one of a plurality of selectable coupling positions so as to be in conductive thermal cooperation with the first surface of the panel structure;
and wherein the phase change material comprises water, calcium chloride, and a nucleating agent.

2. The building ceiling panel apparatus of claim 1, wherein the first rail is elongated along a first axis, and wherein the first rail comprises a plurality of the first notches and a plurality of first teeth positioned in an alternating arrangement along the first axis, wherein the second rail is elongated along a second axis, and wherein the second rail comprises a plurality of the second notches and a plurality of second teeth positioned in an alternating arrangement along the second axis.

3. The building ceiling panel apparatus of claim 2, wherein the at least one container comprises a container body having a first end and a second end, at least one first protrusion extending from the first end of the container body, and at least one second protrusion extending from the second end of the container body, wherein the at least one first protrusion is configured to nest within one of the first notches of the first rail, and wherein the at least one second protrusion is configured to nest within one of the second notches of the second rail.

4. A building ceiling panel apparatus comprising:
a panel structure having a first surface and a second surface opposite the first surface;
a mounting system comprising:
 a first rail configured to be mounted to the panel structure adjacent to a first edge of the panel structure, the first rail comprising at least one first notch;
 a second rail configured to be mounted to the panel structure adjacent to a second edge of the panel structure that is opposite the first edge of the panel structure, the second rail comprising at least one second notch; and
at least one container containing a phase change material, the at least one container configured to be positioned on the first surface of the panel structure so that a first end portion of the at least one container is located within the first notch of the first rail and a second end portion of the at least one container is located within the second notch of the second rail, wherein the at least one container is configured to be positioned on the panel structure at one of a plurality of selectable coupling positions so as to be in conductive thermal cooperation with the first surface of the panel structure,
wherein the phase change material comprises water, calcium chloride and a nucleating agent,
wherein the first rail is elongated along a first axis, and wherein the first rail comprises a plurality of the first notches and a plurality of first teeth positioned in an alternating arrangement along the first axis, wherein the second rail is elongated along a second axis, and wherein the second rail comprises a plurality of the second notches and a plurality of second teeth positioned in an alternating arrangement along the second axis,
wherein the at least one container comprises a container body having a first end and a second end, at least one first protrusion extending from the first end of the container body, and at least one second protrusion extending from the second end of the container body, wherein the at least one first protrusion is configured to nest within one of the first notches of the first rail and wherein at the at least one second protrusion is configured to nest within one of the second notches of the second rail, and wherein the at least one container comprises a pair of the first protrusions that are spaced apart by a first gap and a pair of the second protrusions that are spaced apart by a second gap, and wherein the pair of the first protrusions are configured to nest within two adjacent ones of the first notches of the first rail while one of the first teeth of the first rail extends into the first gap between the pair of the first protrusions and wherein the pair of the second protrusions are configured to nest within two adjacent ones of the second notches of the second rail while one of the second teeth of the second rail extends into the second gap between the pair of the second protrusions.

5. The building ceiling panel apparatus of claim 1, wherein the at least one container comprises a first container and a second container, and wherein the first and second rails are configured to engage each of the first and second containers when the first and second rails are mounted to the panel structure to fix the first and second containers to the panel structure in selected positions of the plurality of selectable coupling positions.

6. The building ceiling panel apparatus of claim 1, wherein the panel structure has an impeding feature, and at least one of the plurality of selectable coupling positions is located to allow coupling of the at least one container to the first surface of the panel structure such that the at least one container avoids the impeding feature; and wherein the impeding feature is an opening in the panel structure for the insertion of a device.

7. The building ceiling panel apparatus of claim 1, wherein the nucleating agent is selected from silica dust, quartz, or combinations thereof.

8. The building ceiling panel apparatus according to claim 1, wherein the mounting system is configured to be fixed to the first surface of the panel structure prior to positioning the at least one container in the one of the plurality of selectable coupling positions.

9. The building ceiling panel apparatus according to claim 8, wherein the at least one container is configured to be detachably snapped into the mounting system in the one of the plurality of selectable coupling positions.

10. The building ceiling panel apparatus according to claim 1, wherein the at least one container is formed from polyethylene or polypropylene.

11. The building ceiling panel apparatus according to claim 1, wherein the at least one container comprises a first container, a second container, and a third container, wherein the first, second, and third containers are arranged in a row with the second container positioned between the first and third containers and with the second container in contact with each of the first and third containers.

12. The building ceiling panel apparatus according to claim 1, further comprising a thermally conductive adhesive configured to couple the at least one container to the first surface of the panel structure.

13. The building ceiling panel apparatus according to claim 12, wherein the impeding feature is an opening in the panel structure that is configured to receive a device.

14. The building ceiling panel apparatus according to claim 1, wherein the at least one container further comprises one or more heat transfer inducing surface features.

15. The building panel ceiling apparatus according to claim 14, wherein the one or more heat transfer inducing surface features are fins.

16. The building panel ceiling apparatus of claim 1, wherein the at least one container comprises a rear side facing away from the panel structure when the at least one container is positioned on the first surface of the panel structure such that the first rail extends over the rear side but not the entirety of the rear side when the first rail is mounted to the panel structure and the second rail extends over the rear side but not the entirety of the rear side when the second rail is mounted to the panel structure.

17. A building panel system comprising:
a panel structure comprising:
 a first surface;
 a second surface opposite the first surface;
 a first edge; and
 a second edge opposite the first edge;
a first rail mountable to the panel structure adjacent the first edge, the first rail comprising a first notch, the first notch and the panel structure co-operatively defining a first mounting window when the first rail is mounted to the panel structure;
a second rail mountable to the panel structure adjacent the second edge, the second rail comprising a second notch, the second notch and the panel structure co-operatively defining a second mounting window when the second rail is mounted to the panel structure; and a container containing a phase change material, the container comprising a first surface opposite a second surface and a first end portion and a second end portion, wherein the first surface of the container is positionable on the first surface of the panel structure so that:

the first rail extends over the first end portion of the container, the first end portion is positioned within the first mounting window, and the first end portion is secured against the panel structure by the first rail; and the second rail extends over the second end portion of the container, the second end portion is positioned within the second mounting window, and the second end portion is secured against the panel structure by the second rail;

wherein the panel structure and the container define a building panel having a first major exposed surface opposing a second major exposed surface;

wherein the second surface of the panel structure defines the first major exposed surface of the building panel; and wherein the second surface of the container defines at least a portion of the second major exposed surface of the building panel.

18. The building panel system of claim 17, wherein the phase change material comprises water, calcium chloride, and a nucleating agent.

\* \* \* \* \*